United States Patent [19]

Ichimura et al.

[11] Patent Number: 4,913,530

[45] Date of Patent: Apr. 3, 1990

[54] LIQUID CRYSTAL DISPLAY

[75] Inventors: Yukiko Ichimura, Yamatokooriyama; Shuichi Kozaki, Nara; Fumiaki Funada, Yamatokooriyama; Hideo Saito, Ichihara; Kenji Furukawa, Yokosuka, all of Japan

[73] Assignees: Sharp Kabushiki Kaisha; Chisso Corporation, both of Osaka, Japan

[21] Appl. No.: 269,316

[22] Filed: Nov. 10, 1988

[30] Foreign Application Priority Data

Nov. 10, 1987 [JP] Japan ................................. 62-285016

[51] Int. Cl.$^4$ .......................... G02F 1/13; C09K 19/34
[52] U.S. Cl. ................................ 350/341; 252/299.01; 252/299.61; 252/299.63; 350/350 R
[58] Field of Search ...................... 252/299.61, 299.63, 252/299.01; 350/250 R, 346, 341

[56] References Cited

U.S. PATENT DOCUMENTS

| 4,533,488 | 8/1985 | Fukui et al. .................. 252/299.61 |
| 4,752,414 | 6/1988 | Eidenschink et al. ......... 252/299.61 |
| 4,776,973 | 10/1988 | Bofinger et al. .............. 252/299.61 |
| 4,779,960 | 10/1988 | Kozaki et al. ................. 350/346 |
| 4,815,825 | 3/1989 | Nakagomi et al. ............ 350/346 |
| 4,824,596 | 4/1989 | Kitano et al. ................. 252/299.61 |

FOREIGN PATENT DOCUMENTS

| 273443 | 7/1988 | European Pat. Off. ....... 252/299.61 |
| 282300 | 9/1988 | European Pat. Off. ....... 252/299.61 |
| 60-51778 | 3/1985 | Japan ............................ 252/299.61 |
| 60-184587 | 9/1985 | Japan ............................ 252/299.61 |

Primary Examiner—Teddy S. Gron

[57] ABSTRACT

A liquid crystal display comprising two substrates and a nematic liquid crystal present between said two substrates, wherein each of said substrates comprises a glass plate, an electrode thereon and an aligning layer subjected to a molecular aligning treatment for a pretilt angle of 1° to 30° on the electrode, wherein an optically active material is added to the nematic crystal which has a positive dielectric anisotropy, wherein the average alignment direction in the longer direction of said liquid crystal molecule is twisted at an angle $\phi$ of 210° to 300° to impart a spiral structure to the liquid crystal and a ratio d/p of the spiral pitch p of the liquid crystal molecule and the liquid crystal thickness d are $$(\phi/360 - \tfrac{1}{2}) < d/p < \phi/360;$$

an improvement being present in that the nematic liquid crystal contains one or more compounds represented by the following formula (I) in an amount of not less than 10% by weight:

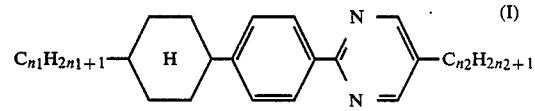

wherein $n_1$ and $n_2$ are each respectively a natural number of not more than 10.

16 Claims, 4 Drawing Sheets

LIQUID CRYSTAL DISPLAY

FIELD OF THE INVENTION

The present invention relates to a super twisted nematic (TN) type liquid crystal display in which a new liquid crystal is employed to enhance multiplex drive characteristics.

BACKGROUND OF THE INVENTION

Figure 3:
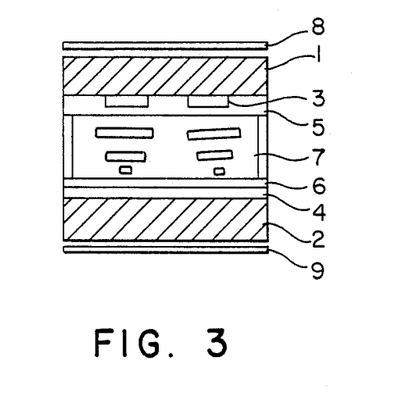
FIG. 3 schematically shows a cross sectional view of a conventional twisted nematic liquid crystal display.
Figure 4:
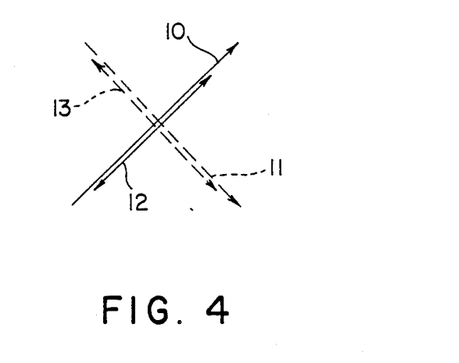
FIG. 4 is a drawing which explains a rubbing angle and an angle of a polarizing plate in the conventional twisted nematic liquid crystal display.

A sectional view of a conventional twisted nematic (TN) liquid crystal display is schematically shown in FIG. 3. In order that the nematic liquid crystal molecules are aligned to form a twisted spiral construction, a diagonal evaporation method or a rubbing method may be employed. The rubbing method is a method wherein a surface of an electrode substrate to be contacted with a liquid crystal is rubbed with cloth in one direction. The two electrode substrates 1 and 2 thus rubbing-treated are positioned to face each other such that their aligning directions are at right angles to each other and a nematic liquid crystal 7 having a positive dielectric anisotropy is put therebetween. The liquid crystal molecules have a spiral construction twisted at 90° between the electrode substrates 1 and 2. In FIG. 4, 10 indicates the rubbing direction of the electrode substrate 1 and 11 indicates the rubbing direction of the electrode substrate 2. Polarizing plates 8 and 9 are respectively placed on the electrode substrates 1 and 2, wherein a polarizing direction 12 of the polarizing plate 8 approximately equals the rubbing direction 10 of the electrode substrate 1 and a polarizing direction 13 of the polarizing plate 9 approximately equals the rubbing direction of the electrode substrate 2 (FIG. 4). In FIG. 3, 3 and 4 indicate transparent electrodes and 5 and 6 indicate alignment layers.

On the other hand, when such a conventional matrix type liquid crystal display is driven by an optimum voltage averaging method of frequency N, a ratio $\alpha$ of an effective voltage [Vrms(ON)/] at a lighting picture element and an effective voltage [Vrms(OFF)] at a non-lighting picture element is shown as follow:

$$\alpha = \frac{Vrms\,(ON)}{Vrms\,(OFF)} = \sqrt{\frac{\sqrt{N}+1}{\sqrt{N}-1}}$$

In the above formula, when $N \to \infty$, $\alpha \to 1$. In other words, the larger the number N, the smaller the difference between Vrms (OFF) and Vrms (ON). Accordingly, in order to obtain a matrix type liquid crystal display having increased display information capacity, it is required for a liquid crystal display to operate with contrast even if the voltage difference between Vrms (ON) and Vrms (OFF) is small. It is therefore desired to develope a liquid crystal having sharp threshold properties or to improve an alignment film. Recently, increased display information capacity has been required in the field of the liquid crystal and the conventional twisted nematic liquid crystal display does not meet this requirement.

In order to obviate the above defects, it is proposed that a twist angle $\phi$ be adjusted to more than 90° to improve multiplex driving properties. This is accomplished by adding an optically active agent in such an amount that a ratio (d/p) of a spiral pitch p and a liquid crystal layer thickness (d) nearly equals $\phi/360°$.

Figure 6:
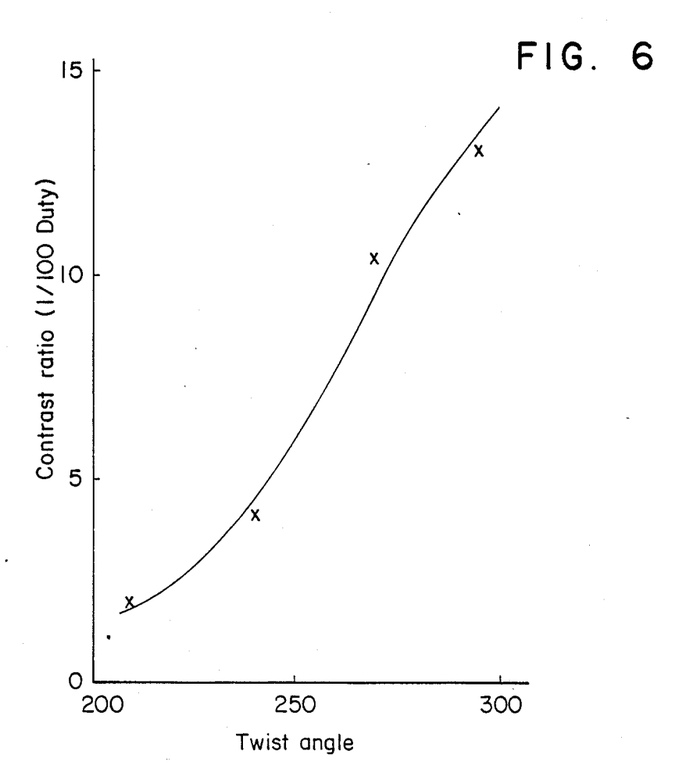
FIG. 6 is a graph which is plotted with contrast ratio as ordinate and twist angle as abscissa, when d/t ratio is 1/100 Duty, d/p is 100/360−0.15 and the liquid crystal employed is PCH type.

The inventors of the present invention have studied the relation of twist angle of a liquid crystal and contrast ratio and the result is shown in FIG. 6. It is apparent from FIG. 6 that the larger the twist angle, the more the contrast ratio. It also has been found that this tendency is the same for another liquid crystal.

Figure 7:
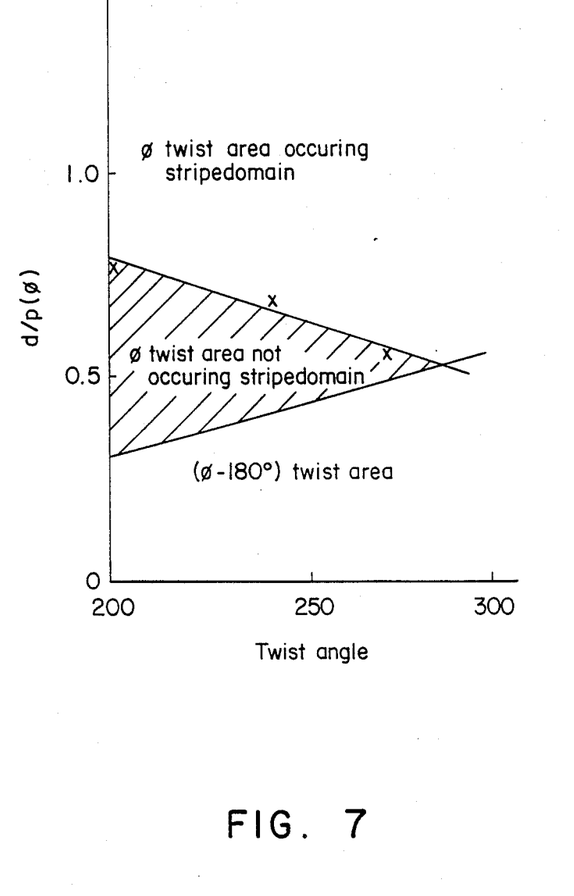
FIG. 7 is a graph showing a dependence of d/p on $\phi$ in a twist area not occurring domain. The liquid crystal material employed is a PHC type.

However, in the case where the twist angle of a liquid crystal is more than 210°, if d/p is ore than a specific value, the alignment of the liquid crystal molecule, when applying a voltage, is disordered causing stripe domains to occur, thus light is scattered resulting in inadequate contrast ratio. The stripe domain occurs more frequently as the twist angle increases. The maximum d/p value above which the stripe domain does not occur becomes lower (see FIG. 7). Even a liquid crystal display having a large contrast ratio is difficult for actual use in view of reliability or uneven cell thickness when the width of d/p, i.e. $\Delta d/p$ ($\phi$), is less than 0.1.

For preventing the occurrence of domain, an aligning film is prepared by a diagonal evaporation method and the angle of a liquid crystal molecule to an electrode substrate, i.e. the pretilt angle, is enlarged to about 30°. The diagonal evaporation method is difficult to use to form a uniform aligning film in a broad area.

The aligning film is presently formed by the rubbing method. In this method, the striped domain occurs and an improved liquid crystal is desired to be selected.

SUMMARY OF THE INVENTION

The inventors of the present invention have found a liquid crystal mixture which prevents the development of the striped domain, and has a high TNI temperature (nematic-isotropic transition temperature) for reducing color change, a low threshold voltage and sharp threshold properties, when an aligning film is prepared by the rubbing method. Accordingly, the present invention provides a liquid crystal display comprising two substrates and a nematic liquid crystal present between the two substrates, wherein each of the substrates comprises a glass plate, an electrode thereon and an aligning layer subjected to a molecular aligning treatment for a pretilt angle of 1° to 30° on the electrode, wherein an optically active material is added to the nematic liquid crystal which has a positive dielectric anisotropy, wherein the average alignment direction in the longer direction of the liquid crystal molecule is twisted at an angle $\phi$ of 210° to 300° to impart a spiral structure to the liquid crystal and a ratio d/p of the spiral pitch p of the liquid crystal molecule and the liquid crystal thickness d are $$(\phi/360 - \tfrac{1}{2}) < d/p < \phi/360;$$

an improvement being present in that the nematic liquid crystal contains one or more compounds represented by the following formula (I) in an amount of not less than 10% by weight:

wherein $n_1$ and $n_2$ are each respectively a natural number of not more than 10.

The present invention also provides a liquid crystal display in which the nematic liquid crystal of the above mentioned liquid crystal display contains, in addition to the compound (I), one or more compounds represented by the following formula (II) in an amount of 10% by weight:

(II)

wherein $n_3$ and $n_4$ respectively are a natural numbr of not more than 10.

The present invention further provides a liquid crystal display in which the nematic liquid crystal of the above mentioned liquid crystal display contains, in addition to the compound (I), one or more compounds represented by the following formula (III) in an amount of 5% by weight:

(III)

wherein $n_5$, $n_6$ and $n_7$ are each respectively a natural number of not more than 10.

PREFERRED EMBODIMENT OF THE INVENTION

Figure 1:
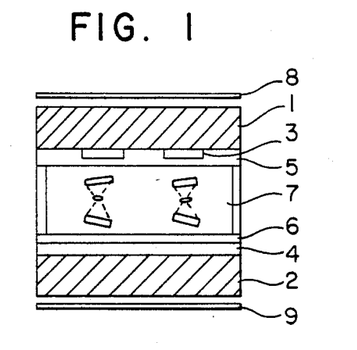
FIG. 1 schematically shows a cross sectional view of a twisted nematic liquid crystal display of the present invention.

FIG. 1 schematically shows a cross sectional view of the twisted nematic liquid crystal display of the present invention. In FIG. 1, a transparent electrode of indium oxide is patterned on the upside of an upper glass substrate 1, which is indicated as 3, and on the downside of a lower substrate 2, which is indicated as 4. Aligning films 5 and 6 made from polyimidesilane type polymer are then formed thereon and rubbed with cloth in one direction to form a liquid crystal cell. 7 shows a liquid crystal layer, 8 shows an upper polarizing plate and 9 shows a lower polarizing plate. The polarizing plates 5 and 6 are prepared by condensing 0.1 mol of 1,3-bis-(aminopropyl)tetramethyldisiloxane, 0.9 mol of 4,4'-diaminodiphenyl ether and 1.0 mol of 3,3',4,4'-benzophenone tetracarboxylic anhydride in N-methylpyrolidone to form a 30% prepolymer solution in N-methylpyrolidone, followed by applying it with a spinner and then reacting at 50° C. for one hour.

Figure 2:
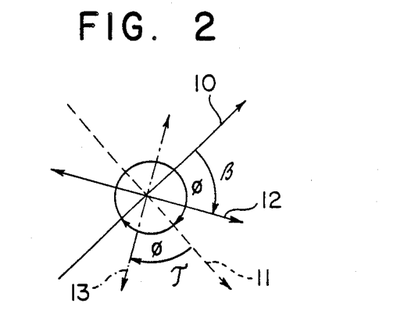
FIG. 2 is a drawing which explains a rubbing angle and an angle of a polarizing plate in the twisted nematic liquid crystal display of the present invention.

FIG. 2 is a drawing which explains a rubbing angle and an angle of a polarizing plate in the twisted nematic liquid crystal display of the present invention. In FIG. 2, $\psi$ is an angle between the rubbing direction 10 of the upper glass substrate 1 and the rubbing direction 11 of the lower glass substrate 2. $\phi$ shows a twist angle of the liquid crystal molecule and meets $\psi=360°-\phi$. The twist angle is varied depending upon d/p ratio wherein p is a spiral pitch derived from adding an optically active agent to the nematic liquid crystal and d is a thickness of the liquid crystal layer. In order to adjust the twist angle of the liquid crystal molecule to $\phi$, the following formula:

$$(\phi/360°-\tfrac{1}{2})<d/p<(\phi/360°)$$

has to be satisfied.

The liquid crystal was evaluated as follows. A mother liquid crystal was fixed and the liquid crystal shown below was added to the mother liquid crystal in every 20 wt %. The following table shows the ingredients of the liquid crystal of the present invention and a conventional one.

-continued

Liquid crystal added to a mother liquid crystal in an amount of 20 wt %

Conventional Example 2

Conventional Example 3

Conventional Example 4

Conventional Example 5

Conventional Example 6

Conventional Example 7

Conventional Example 8

The ingredients of the mother liquid crystal are shown as follow:

15 wt %

10 wt %

15 wt %

10 wt %

10 wt %

10 wt %

5 wt %

15 wt %

10 wt %

Physical properties of Example 1 and Conventional Examples 1 to 8 are shown in the following Table 1.

TABLE 1

|  | TNI (°C.) | Maximum d/p* at which no domain occurs | α** |
|---|---|---|---|
| Example 1 | 83 | 0.62 | 1.05 |
| Con. Ex. 1 | 78 | 0.57 | 1.09 |
| Con. Ex. 2 | 45 | 0.58 | 1.09 |
| Con. Ex. 3 | 48 | 0.55 | 1.08 |
| Con. Ex. 4 | 45 | 0.53 | 1.08 |
| Con. Ex. 5 | 52 | 0.49 | 1.09 |
| Con. Ex. 6 | 42 | 0.45 | 1.06 |
| Con. Ex. 7 | 58 | 0.56 | 1.08 |
| Con. Ex. 8 | 55 | 0.57 | 1.10 |

Figure 5:
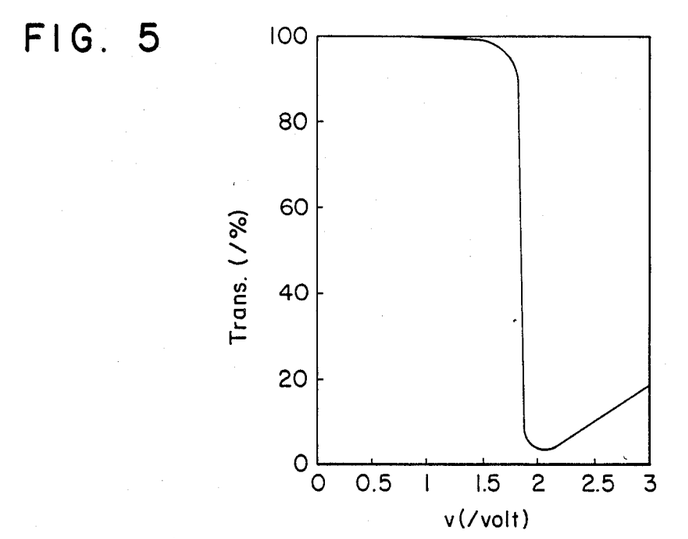
FIG. 5 is a graph which is plotted with light transmittance (%) as ordinate and applied voltage (volt) as abscissa when the twisted nematic liquid crystal display of the present invention is in a yellow mode.

*Measured by a cell having a twist angle of 240°.
**Δnd(birefringence degree of liquid crystal times liquid crystal layer thickness) was fixed to 0.8 and electro-optic properties were determined by a cell having a twist angle of 240° in a yellow mode (polarizing film was adjusted to β = 45° and γ = 45° in FIG. 2 and a chiral dopant was CB-15 available from Merck Company). A ratio of applied voltage when a trancemissivity is 10% and applied voltage when a trancemissivity is 90% ($V_{10\%}/V_{90\%}$) was represented as α. A curve of the electro-optical properties is shown in FIG. 5.

As is apparent from Table 1, the compound of Example 1 represented by increases TNI temperature and effectively prevents domain, as well as providing for sharper threshold properties in comparison with the conventional compounds. These superior effects were the same in another mother liquid crystal composition. This was also identified within the range of a twist angle of 210° to 300°.

Nn type liquid crystal materials having the following were added to the mother liquid crystal composition in an amount of every 20 wt% and their physical properties are shown in Table 2.

| | Liquid crystal added to a mother liquid crystal in an mount of 20 wt % |
|---|---|
| Example 1 |  |
| Conventional Example 9 |  |
| Conventional Example 10 |  |
| Conventional Example 11 |  |
| Conventional Example 12 |  |
| Conventional Example 13 |  |

TABLE 2

| | TNI (°C.) | Maximum d/p* at which no domain occurs | ** Vth (v) |
|---|---|---|---|
| Example 1 | 83 | 0.62 | 1.8 |
| Con. Ex. 9 | 80 | 0.54 | 2.1 |
| Con. Ex. 10 | 78 | 0.58 | 2.0 |
| Con. Ex. 11 | 70 | 0.47 | 2.3 |
| Con. Ex. 12 | 81 | 0.45 | 2.5 |
| Con. Ex. 13 | 81 | 0.49 | 2.2 |

*Measured by a cell having a twist angle of 240°.
**And was set at 0.8 and electro-optical properties were measured by a cell having a twist angle of 240° in a yellow mode. An applied voltage at a trancemissivity of 90% is represented by Vth.

As is apparent from Table 2, the compound of Example 1 represented by increases TNI temperature and effectively prevents domain (d/p<0.6) as well as lowers Vth in comparison with the conventional compounds. This superior effects are the same in another mother liquid crystal composition. This is also identified within the range of a twist angle of 210° to 300°.

EXAMPLES 2 AND 3

A compound represented by the following formula;

was employed and their properties were studied to show in Tables 3 and 4. The compositional ingredients are followings:

-continued

6 wt %

10 wt %

5 wt %

5 wt %

5 wt %

10 wt %

10 wt %

7 wt %

7 wt %

7 wt %

10 wt % ⎫
 5 wt %  ⎬ Compounds B
                                ⎭

(Example 3)

7 wt %

-continued 7 wt %

6 wt %

10 wt %

10 wt %

10 wt %

5 wt %

5 wt %

10 wt %

5 wt %

5 wt %

10 wt %

10 wt %

TABLE 3

|  | TNI(°C.) | Maximum d/p[1] at which no domain occurs | Vth[2] (v) | α[3] | Tr/Td[4] (msec) |
| --- | --- | --- | --- | --- | --- |
| Example 2 | 98 | 0.64 | 2.0 | 1.06 | 90/203 |
| Example 3 | 83 | 0.65 | 1.8 | 1.07 | 85/186 |

[1]Measured by a cell having a twist angle of 240°.
[2]Electro-optical properties were measured by a cell having a twist angle of 240° in an yellow mode. Vth = V$_{90\%}$
[3]Electro-optical properties were measured by a cell having a twist angle of 240° in an yellow mode. α = V$_{10\%}$/V$_{90\%}$
[4]Response properties are measured by a cell having a twist angle of 240° in an yellow mode. Assuming that a response time is proportionate to a square of a cell thickness, A cell thickness (6 μm) conversion value was calculated to Tr and Td. 1/100 Duty dynamic response.

TABLE 4

|  | Maximum d/p[5] at which no domain occurs | Vth[6] (v) | $\alpha$[7] | Tr/Td[8] (msec) |
|---|---|---|---|---|
| Example 2 | 0.60 | 2.2 | 1.03 | 110/234 |
| Example 3 | 0.61 | 2.0 | 1.04 | 105/228 |

[5] Measured by a cell having a twist angle of 270°. $\beta = 60°$ and $\gamma = 30°$ in FIG. 2.
[6] Electro-optical properties were measured by a cell having a twist angle of 270° in an yellow mode. Vth = $V_{90\%}$
[7] Electro-optical properties were measured by a cell having a twist angle of 270° in an yellow mode. $\alpha = V_{10\%}/V_{90\%}$
[8] Response properties are measured by a cell having a twist angle of 270° in an yellow mode. Assuming that a response time is proportionate to a square of a cell thickness, A cell thickness (6 μm) conversion value of 1/100 Duty dynamic response.

As is apparent from the above Examples and Conventional Examples, the liquid crystal composition of the present invention effectively prevents occurrence of domain, has sharp threshold properties and high TNI, and has a lowered voltage threshold value sufficient to be driven by an LSI, as well as has a short response time.

Figure 8:
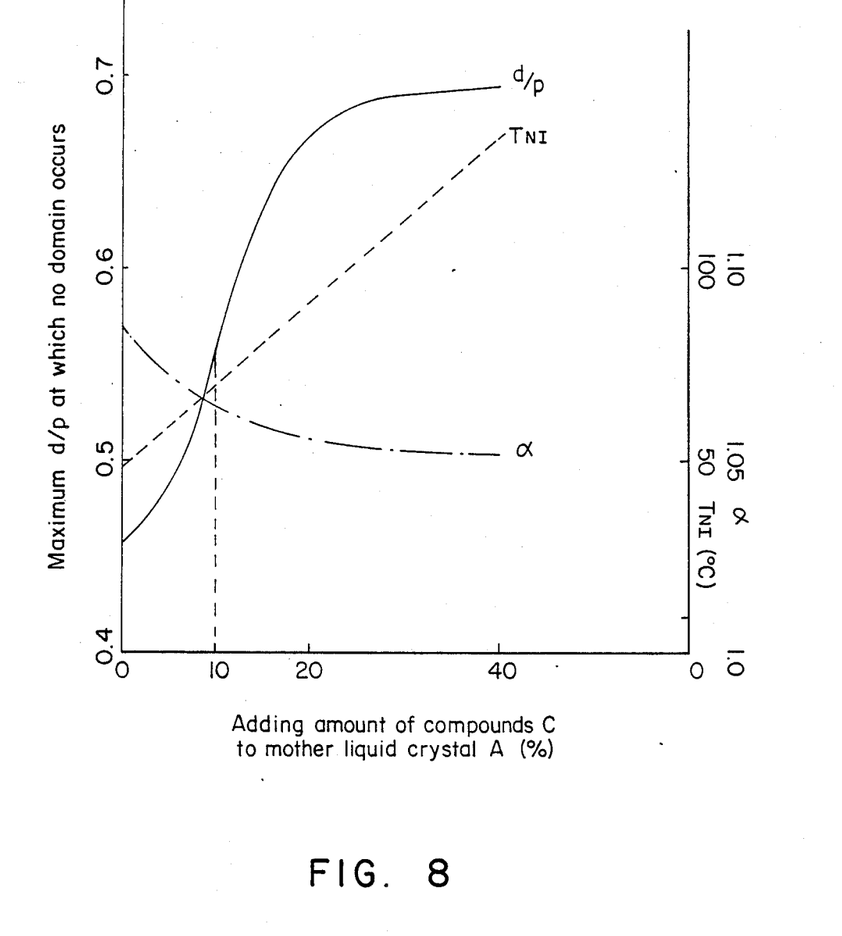
FIG. 8 is a graph showing the effects on physical properties of adding amount of the following compound C.

FIG. 8 is a graph showing effects of an amount of the following compound C on physical properties, such as maximum d/p at which no domain occurs, and threshold properties at TNI of 240° in a twist cell.

Compounds C

As is apparent from FIG. 8, when the compounds C is added in an amount of at least 10 wt %, the technical effects of the present invention, such as increase of TNI, prevention of domain and sharp threshold properties are obtained.

If the following compounds II;

are added in an amount of more than 10 wt%, a voltage threshold value is lowered as as to be driven by LSI.
If the following compounds III;

are added in an amount of 5 wt%, it provides a high TNI temperature of more 90° C.

In the above Examples, the optically active material which is added for preventing twist discrimination and shown as follows is employed:

It may be replaced by a chiral nematic liquid crystal, such as:

-continued wherein 2MB is the following group and C* is an asymmetric carbon.

or a cholesteric liquid crystal, such as wherein X is —Cl, —OCOC$_8$H$_{17}$ or

What is claimed is:

1. A liquid crystal display comprising two substrates and a positive dielectric anisotropy nematic liquid crystal present between said two substrates, wherein each of said substrates comprises a glass plate, an electrode thereon and an aligning layer subjected to a molecular aligning treatment for a pretilt angle of 1° to 30° on the electrode, wherin an optically active material is added to said nematic crystal, and wherein the average alignment direction in the longer direction of said liquid crystal molecule is twisted at an angle $\phi$ of 210° to 300° to impart a spiral structure to said liquid crystal and a ratio d/p of the spiral pitch p of said liquid crystal molecule and the liquid crystal thickness d are

$(\phi/360 - \frac{1}{4}) < d/p < \phi/360;$ wherein said nematic liquid crystal further contains one or more compounds represented by the following formula (I) in a total amount of not less than 10% by weight based on the total amount of the nematic liquid crystal:

wherein n$_1$ and n$_2$ are each respectively a natural number of not more than 10.

2. The liquid crystal display according to claim 1, wherein said nematic liquid crystal contains, in addition to the compound (I), one or more compounds represented by the following formula (II) in a total amount of not less than 10% by weight based on the total amount of the nematic liquid crystal:

wherein n$_3$ and n$_4$ are each respectively a natural number of not more than 10.

3. The liquid crystal display according to claim 1, wherein said nematic liquid crystal contains, in addition to the compound (I), one or more compounds represented by the following formula (III) in a total amount of not less than 5% by weight based on the total amount of the nematic liquid crystal:

wherein n$_5$, n$_6$ and n$_7$ are each respectively a natural number of not more than 10.

4. The liquid crystal display according to claim 2, wherein said nematic liquid crystal contains, in addition to the compound (I), one or more compounds represented by the following formula (III) in a total amount of not less than 5% by weight based on the total amount of the nematic liquid crystal:

wherein n$_5$, n$_6$ and n$_7$ are each respectively a natural number of not more than 10.

5. The liquid crystal display according to claim 1, wherein the total amount of the compounds of formula (I) is from 10% to 40% by weight.

6. The liquid crystal display according to claim 1, wherein the total amount of the compounds of formula (I) is from 10% to 20% by weight.

7. The liquid crystal display according to claim 2, wherein the total amount of the compounds of formula (I) is from 10% to 40% by weight.

8. The liquid crystal display according to claim 2, wherein the total amount of the compounds of formula (I) is from 10% to 20% by weight.

9. The liquid crystal display according to claim 3, wherein the total amount of the compounds of formula (I) is from 10% to 40% by weight.

10. The liquid crystal display according to claim 3, wherein the total amount of the compounds of formula (I) is from 10% to 20% by weight.

11. The liquid crystal display according to claim 4, wherein the total amount of the compounds of formula (I) is from 10% to 40% by weight.

12. The liquid crystal display according to claim 4, wherein the total amount of the compounds of formula (I) is from 10% to 20% by weight.

13. The liquid crystal display according to claim 2, wherein the total amount of the compounds of formula (II) is from 10% to 30% by weight.

14. The liquid crystal display according to claim 3, wherein the total amount of the compounds of formula (III) is from 5% to 15% by weight.

15. The liquid crystal display according to claim 4, wherein the total amount of the compounds of formula (II) is from 10% to 30% by weight.

16. The liquid crystal display according to claim 15, wherein the total amount of the compounds of formula (III) is from 5% to 15% by weight.

* * * * *